This invention relates to gages and more patricularly to gages for accurately determining the size relationships of workpieces with respect to a standard size or dimension.

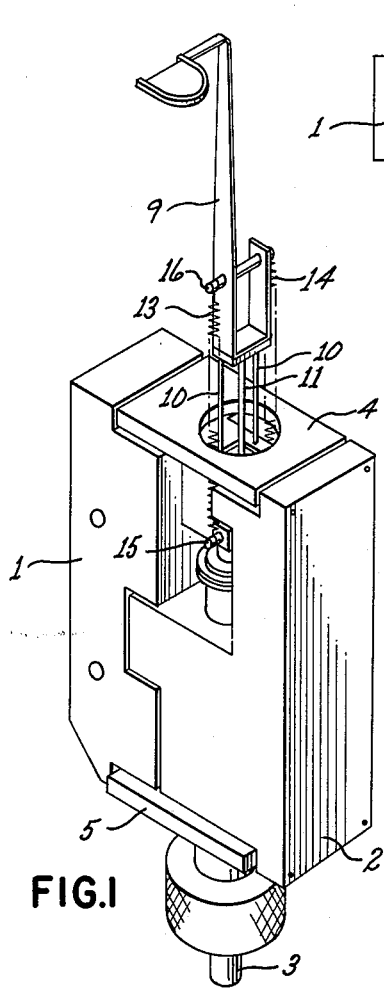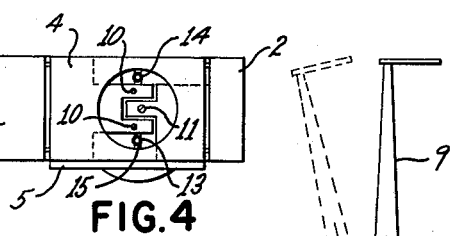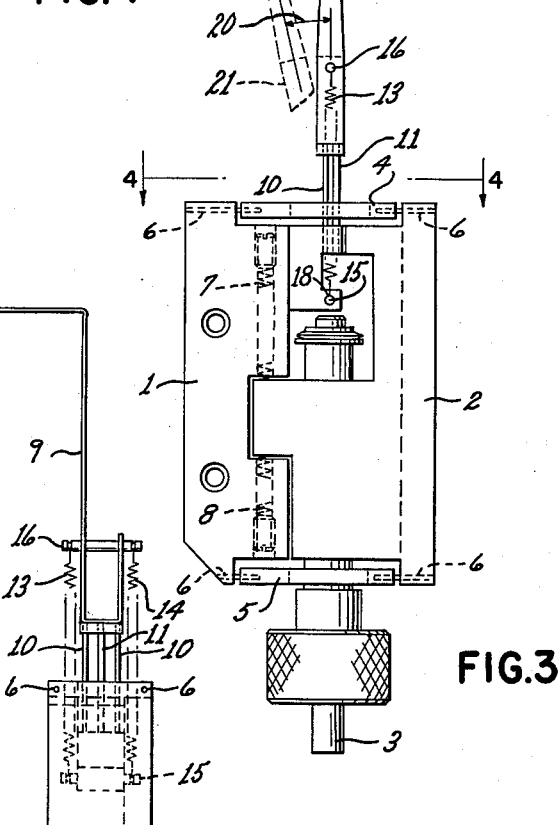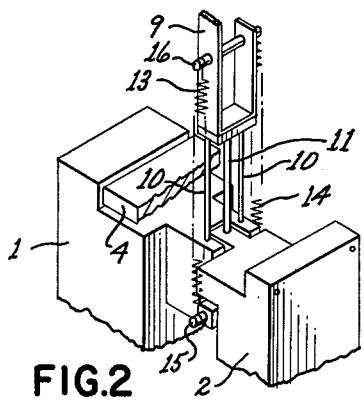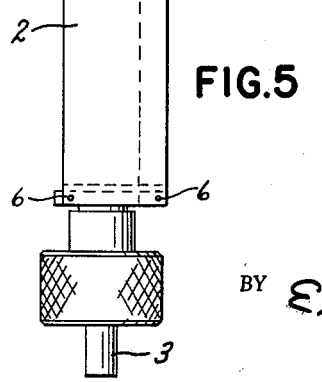
INVENTOR.
WILLIS FAY ALLER
BY Ernest J. Hix
HIS ATTORNEY 3,193,938
GAGING DEVICE
Willis Fay Aller, Dayton, Ohio, assignor to The Sheffield Corporation, Dayton, Ohio, a corporation of Delaware
Filed Jan. 28, 1963, Ser. No. 254,224
6 Claims. (Cl. 33—172)

One object of the invention is the provision of a gage having a work operated member mounted for rectilinear movement on a supporting member by parallel flexible arms, and with flexible mounting means attaching the supporting member and the supported member to an indicator which moves in accordance with movement of the supported member, and with provision for aiding the movement of the indicator as it operates to either side from a reference position.

Another object of the invention is the provision of a gage with a supporting member carrying a work operated supported member by parallel flexible rods attaching the members and providing rectilinear movement, and an indicator attached to the members by flexible mounting means which normally extend parallel to each other and are arranged in spaced relation such as to provide a broad stable base in one direction but flexing movements in a direction transverse to the direction of motion of the supporting member.

Another object of the invention is the provision, in a gage of the character mentioned, of an indicator which is carried for movement through an arc by flexible rods having substantially cylindrical attaching ends fixed in the supporting member and in the supported member and secured at their opposite ends to an indicator.

Another object of the invention is the provision, in a gage of the character mentioned, of a spring means so arranged as to aid movement of the indicator to either side of a reference position by exerting a force which increases with increased movement of the indicator through an increased arc to either side of the reference position.

Other objects and advantages will be apparent from the following description, the appended claims, and the accompanying drawings, in which:

FIG. 1 is a perspective view of a device incorporating the present invention.

FIG. 2 is a view of the device shown in FIG. 1 with parts broken away.

FIG. 3 is a front view of the device of FIG. 1.

FIG. 4 is a view on the line 4—4 of FIG. 3.

FIG. 5 is a side view of the device of FIG. 1.

The present invention relates to gages of the general character described in Patent Number 2,244,964. Such a gage has a base for supporting a workpiece and a housing adjustably mounted on a column provided on the base. An indicating device for determining the size of the workpiece with relation to a given standard is adjustably mounted within the housing. The indicating device has a target which intercepts a beam of light from a light source in the housing to cast an image on an observable graduated scale suitably arranged in the housing to thereby indicate a size measurement of the workpiece.

The indicating device of FIG. 1 in the drawing presents an exemplary illustration of the present invention and has a supporting member or a fixed block 1 fixed in any suitable manner within the housing previously mentioned and a supported member or movable block 2 movably supported from the fixed block and carrying a work contacting portion or probe 3. Parallel flexible arms are fixed to the fixed block and the movable block to provide frictionless movement of the movable block. In the illustrated embodiment the flexible arms, as illustrated in FIGS. 3 and 4, are preferably comprised of connecting members such as parallel plates 4 and 5 with comparatively short flexible bars 6 fixed at their opposite ends. The flexible bars at one end of the plates are attached to the fixed block and those at the opposite end are fixed to the movable block. Movement of the movable block is generally of the order of only a few thousandths of an inch or less and is essentially rectilinear in a direction transverse to the parallel arms. Motion of the movable block is produced by the work contacting probe 3 contacting the workpiece. A pair of springs 7 and 8 are suitably installed in the fixed block acting in opposition and adjustable to counterbalance the weight of the movable block and yieldingly position the movable block in a desired position.

Flexible mounting means are fixed to the blocks and to an indicator 9. The mounting means are comprised of a plurality of parallel rods widely spaced apart in one direction to provide convenient attachment and a broad stable base but closely spaced in a direction transverse to the direction of motion of the movable member to determine the amount of movement of the indicator dependent on the amount of this spacing. In the illustrated embodiment the flexible mounting means are comprised preferably of a pair of flexible rods 10 arranged with their axes normally parallel and having circular cross sections and substantially cylindrical ends suitably fixed at one end to the fixed block and a flexible rod 11 having a circular cross section and substantially cylindrical ends attached to and preferably embedded at one end in the movable member. The flexible rods are fixed at their opposite ends to the indicator 9 to thereby transmit a frictionless movement to the indicator 9 with the movement of the movable block. The rod 11 is arranged parallel to the pair of rods 10 and provides a resistance to flexing generally equivalent to the pair of rods 10, and in the illustrated embodiment this is preferably accomplished by making the rod 11 of greater cross sectional area than each of the rods in the pair. As the work contacting probe engages the workpiece the movable block transmits a flexing motion through the flexible rods to the attached indicator in a direction which is generally transverse to the direction of movement of the movable member and perpendicular to a plane drawn through the axes of the pair of rods. The rods in the pair 10 are spaced apart a relatively large distance compared to their diameter. In addition the rod 11 is attached to the movable member and spaced a close distance in a direction perpendicular to said plane compared to the large distance between the pair to thereby provide a broad stable base in one direction and the desired amount of swinging movement of the indicator in the direction of flexing.

The flexible rods are normally in a reference position of repose with their axes parallel and flex through an angle to either side of the reference position. The deviation of a workpiece from a given standard causes deflection of the indicator and thereby indicates a size measurement on the scale on the housing as previously described. Greater deviation from a given size normally requires increased force application to obtain increased flexing of the rods and greater movement of the indicator and this requires an equal and opposite force to be transmitted to the workpiece by the work contacting probe. It is desirable, however, to maintain the gaging pressure as constant as possible throughout the gaging range. In the case of thin walled workpieces or workpieces of relatively low hardness a large increase in gaging pressure could cause a possible indentation and damage to the workpiece as well as an erroneous measurement.

To solve this problem a compensating spring means is provided attached at one end to the fixed block and at the opposite end to the indicator. In the illustrated embodiment preferably a pair of compensating springs 13 and 14 are provided which are attached at one end to the fixed block by the use of a connecting pin 15 suitably fastened thereto and at the other end to the indicator by the use of another connecting pin 16 suitably fastened thereto. The compensating springs 13 and 14 are symmetrically arranged with respect to the parallel rods. The compensating springs are in tension and are arranged in a reference position with their axes parallel and parallel to and on either side of the flexible rods in their reference position. The compensating springs apply a force on a vector preferably toward and through an attach point on the fixed block at 18 for the connecting pin 15. As the work contacting probe contacts a workpiece force is exerted against the probe as previously described, and the indicator is moved through an angle from its normal position to either side of the reference postion of the rods and the reference position of the compensating springs, for example, through an angle at 20 toward a position shown in dotted lines at 21. The springs 13 and 14 exert a force to help the movement and thereby reduce the equal and opposite force otherwise required to be exerted by the work contacting probe against the workpiece to obtain a given movement for any given size. This reduction in force produces a greatly reduced gaging pressure as the indicator deflects from its normal position.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:

1. A gage comprising,
a supporting member,
a supported member having a work contacting portion,
parallel flexible arms fixed to the supporting member and supported member and providing rectilinear motion of the supported member in a direction generally transverse to said parallel arms,
an indicator,
flexible mounting means extending between the indicator and the members and attached at their end portions to the members and indicator respectively and said mounting means normally extending parallel to one another and flexing in a direction transverse to the direction of motion of the supported member and at least one of said members having a plurality of such flexible mounting means connected thereto and to the indicator and spaced apart a substantial distance in a direction transverse to the direction of flexing, and the flexible mounting means of one of the members being closely spaced from the flexible mounting means of the other member in the direction of flexing, so that the flexing of the mounting means produces a swinging movement of the indicator,
and a compensating spring attached to a spring attach point on the supporting member and to the indicator and applying its force while in a reference position on a vector parallel to the mounting means in their normal positions and acting toward the attach point on the supporting member, and deflectable through an angle having its apex at the spring attach point with movement of the indicator, whereby as the angle increases to a side from the reference position the force aiding movement of the indicator increases.

2. A gage comprising,
a support,
a movable member having a work contact portion,
parallel flexible suporting members fixed to the support and movable member and providing rectilinear motion of the movable member,
a flexible rod having an axis normally in a straight line attached to the support and a flexible rod having an axis normally in a straight line parallel to the axis of the first flexible rod and in a spaced relation from the first flexible rod attached to the movable member, said rods flexing from a parallel reference position of repose,
an indicating member fixed to said flexible rods and movable in an arc in accordance with movement of the movable member and normally requiring increased force to move the indicating member through an increased arc,
and a compensating spring attached to a spring attach point on the support and to the indicating member and applying its force with the rods in said reference position on a vector parallel to and equidistant from the rods and acting toward the attach point on the support, and deflectable through an angle having its apex at the spring attach point with movement of the indicating member, whereby as the angle increases to a side from said parallel vector the force aiding movement of the indicating member increases.

3. A gage comprising,
a supporting member,
a supported member having a work contacting portion,
parallel flexible arms fixed to the supporting member and supported member and providing rectilinear motion of the supported member in a direction generally transverse to said parallel arms,
and indicator,
flexible mounting rods having round cross sections and substantially cylindrical attaching end portions extending between the indicator and the members and fixed at their end portions to the members and indicator respectively and said mounting rods normally extending parallel to one another and flexing in a direction transverse to the direction of motion of the supported member and at least one of said members having a plurality of such flexible mounting rods connected thereto and to the indicator and spaced apart a substantial distance in a direction transverse to the direction of flexing, and the flexible mounting rods of one of the members being closely spaced from the flexible mounting rods of the other member in the direction of flexing compared to said substantial distance, so that the flexing of the mounting rods produces a swinging movement of the indicator,
and a compensating spring attached to a spring attach point on the supporting member and to the indicator and applying its force while in a reference position on a vector parallel to the mounting means in their normal positions and acting toward the attach point on the supporting member, and deflectable through an angle having its apex at the spring attach point with movement of the indicator, whereby as the angle increases to a side from the reference position the force aiding movement of the indicator increases.

4. A gage comprising,
a supporting member,
a supported member having a work contacting portion,
parallel flexible arms fixed to the supporting member and supported member and providing rectilinear motion of the supported member in a direction generally transverse to said parallel arms,
an indicator,
flexible mounting means extending between the indicator and the members and attached at their end portions to the members and indicator respectively and said mounting means normally extending parallel to one another and flexing from a reference position of repose in a direction transverse to the direction of motion of the supported member and at least one of said members having a plurality of such flexible mounting means connected thereto and to the indicator and spaced apart a substantial distance in a direction transverse to the direction of flexing to thereby provide a broad stable base in this direction, and the flexible mounting means of one of the members being closely spaced compared to said substantial distance from the flexible mounting means of the other member in the direction of flexing, so that the flexing of the mounting means produces a swinging movement of the indicator in the direction of flexing, and a compensating spring attached to a spring attach point on the supporting member and to the indicator and applying its force with the mounting means in said reference position on a vector parallel to the mounting means in their normal positions and acting toward the attach point on the supporting member, and deflectable through an angle, having its apex at the spring attach point with movement of the indicator whereby as the angle increases to a side from said parallel vector the force aiding movement of the indicator increases.

5. A gage comprising, a supporting member, a supported member having a work contacting portion, parallel flexible arms fixed to the supporting member and supported member and providing rectilinear motion of the supported member in a direction generally transverse to said parallel arms, an indicator, flexible mounting means extending between the indicator and the members and attached at their end portions to the members and indicator respectively and said mounting means normally extending parallel to one another and flexing from a reference position of repose in a direction transverse to the direction of motion of the supported member so that the flexing of the mounting means produces a swinging movement of the indicator in the direction of flexing, and a compensating spring attached to a spring attach point on the supporting member and to the indicator and applying its force with the mounting means in said reference position on a vector parallel to the mounting means in their normal positions and acting toward the attach point on the supporting member, and deflectable through an angle, having its apex at the spring attach point with movement of the indicator, whereby as the angle increases to a side from said parallel vector the force aiding movement of the indicator increases.

6. A gage comprising, a supporting member, a supported member having a work contacting portion, parallel flexible arms fixed to the supporting member and supported member and providing rectilinear motion of the supported member in a direction generally transverse to said parallel arms, an indicator, flexible mounting means extending between the indicator and the members and attached at their end portions to the members and indicator respectively and said mounting means normally extending parallel to one another and flexing from a reference position of repose in a direction transverse to the direction of motion of the supported member so that the flexing of the mounting means produces a swinging movement of the indicator in the direction of flexing, and yielding means attached to an attach point on the supporting member and to the indicator and applying its force with the mounting means in said reference position on a vector parallel to the mounting means in their normal positions and acting toward the attach point on the supporting member, and deflectable through an angle, having its apex at said attach point with movement of the indicator, whereby as the angle increases to a side from said parallel vector the force aiding movement of the indicator increases.

References Cited by the Examiner

UNITED STATES PATENTS

| | | | |
|---|---|---|---|
| 2,244,964 | 6/41 | Poock et al. | 33—172 |
| 2,932,482 | 4/60 | Dickie | 267—1 |

ISAAC LISANN, *Primary Examiner.*